United States Patent
Hess et al.

(10) Patent No.: US 9,335,183 B2
(45) Date of Patent: May 10, 2016

(54) METHOD FOR RELIABLY OPERATING A SENSOR

(75) Inventors: Thomas Hess, Bad Liebenzell (DE);
Philip S. Schulz, Boeblingen (DE);
Markus Strasser, Metzingen (DE);
Sven Wagner, Tiefenbronn (DE);
Constantin Werner, Schoenaich (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 818 days.

(21) Appl. No.: 13/442,901

(22) Filed: Apr. 10, 2012

(65) Prior Publication Data
US 2012/0265471 A1   Oct. 18, 2012

(30) Foreign Application Priority Data
Apr. 12, 2011 (EP) .................... 11162052

(51) Int. Cl.
*G01D 18/00* (2006.01)
*G01F 19/00* (2006.01)
*G06F 11/30* (2006.01)
*G01D 3/036* (2006.01)

(52) U.S. Cl.
CPC ............ *G01D 3/036* (2013.01); *G01D 18/00* (2013.01); *G01D 18/002* (2013.01); *G01D 18/006* (2013.01); *G06F 11/30* (2013.01)

(58) Field of Classification Search
CPC .................... G01D 18/00; G01F 19/00

USPC ............ 702/88, 104, 183; 340/501, 506, 511, 340/870.04
See application file for complete search history.

(56) References Cited

U.S. PATENT DOCUMENTS

| | | | | |
|---|---|---|---|---|
| 4,535,598 A * | 8/1985 | Mount | ............ | 62/126 |
| 5,829,879 A * | 11/1998 | Sanchez et al. | ............ | 374/178 |
| 5,878,377 A * | 3/1999 | Hamilton et al. | ............ | 702/132 |
| 6,630,754 B1 | 10/2003 | Pippin | | |
| 6,788,198 B2 * | 9/2004 | Harshaw | ............ | 340/522 |
| 6,940,413 B2 | 9/2005 | Longobardi | | |
| 7,451,332 B2 | 11/2008 | Culbert et al. | | |
| 7,587,262 B1 * | 9/2009 | Pippin | ............ | 700/299 |
| 8,023,235 B2 * | 9/2011 | Bilac et al. | ............ | 361/42 |
| 2006/0246922 A1 | 11/2006 | Gasbarro et al. | | |
| 2006/0273896 A1 | 12/2006 | Kates | | |
| 2009/0115619 A1 | 5/2009 | Chen | | |
| 2010/0106321 A1 * | 4/2010 | Hadzidedic | ............ | 700/276 |
| 2011/0213212 A1 * | 9/2011 | Al-Ali | ............ | 600/300 |

* cited by examiner

*Primary Examiner* — Huan Tran
(74) *Attorney, Agent, or Firm* — Steven Chiu, Esq.; Kevin P. Radigan, Esq.; Heslin Rothenberg Farley & Mesiti P.C.

(57) ABSTRACT

A method is presented for reliably operating at least one sensor connected to a central control unit. Each sensor senses a sensor value for its sensor parameter and creates an interrupt to the control unit when its sensor value is outside a sensor value range limited by an upper and a lower threshold. Upon generation of an interrupt by a sensor, a modified sensor value range is calculated so that the sensor value causing the interrupt lies within the modified sensor value range, and the modified sensor value range is applied to the respective sensor. The method further includes repeatedly verifying correct behavior of each sensor. A computer-readable medium, a computer program product, and a system for executing the above-summarized method are also presented.

20 Claims, 9 Drawing Sheets

METHOD FOR RELIABLY OPERATING A SENSOR

PRIOR FOREIGN APPLICATION

This application claims priority from European patent application number EP11162052.2, filed Apr. 12, 2011, which is hereby incorporated herein by reference in its entirety.

FIELD OF THE INVENTION

The present invention relates to a method for reliably operating at least one sensor connected to a central control unit, whereby each sensor senses a sensor value for its sensor parameter and creates an interrupt to the control unit when its sensor value is outside a sensor value range limited by an upper and a lower threshold, upon generation of an interrupt by a sensor, a modified sensor value range is calculated so that the sensor value causing the interrupt lies within the modified sensor value range, and the modified sensor value range is applied to the respective sensor. The present invention further relates to a computer readable medium, a computer program product and a system for executing the above method.

BACKGROUND

Methods for operating sensors are implemented in the art in two alternative ways. The first way corresponds to a polling method, whereby a central control unit polls every connected sensor according to a given polling period or polling frequency to receive a current sensor value and compares the received sensor value to at least one given threshold, i.e. an upper or a lower threshold. Accordingly, the central control unit has to reserve resources for performing the polling, whereby the required resources increase with the number of connected sensors. The second way refers to an interrupt driven approach, whereby each sensor comprises a logic circuit for comparing its sensor value to at least one threshold value, i.e. an upper or a lower threshold, and generates an interrupt to the central control unit, when the sensor value is above the upper threshold or below the lower threshold. In case the sensor has the two thresholds implemented, the interrupt is generated when the sensor value leaves a sensor value range lying between the upper and the lower threshold. The interrupt driven operation generally reduces the processing workload of the central control unit, because it is not continuously occupied and only has to handle the incoming interrupts. Nevertheless, the interrupt driven approach also has drawbacks. First of all, in case of frequent changes of the sensor value or the sensor value remaining for an extended time above the upper threshold or below the lower threshold, a high number of interrupts can be generated by the sensor and thereby create a significant work load for the central control unit. As specified below, the number of interrupts can be reduced, e.g. by a modification of the thresholds.

In computer systems, also referred to as IT-systems, many physical sensors can be provided and operated for monitoring sensor parameters, e.g. the temperatures, currents, voltages and/or other physical values relevant for the computer systems. The sensors are usually monitored by the IT system itself, which means that at least one CPU core of the IT-system fulfils the task of the central control unit. Accordingly, the performance of IT-systems decreases the more resources are required for monitoring the sensors. Since these IT systems can comprise a high number of sensors, the performance of the IT system can be significantly reduced because of monitoring the sensors. This problem can be overcome by monitoring the sensors based on an interrupt driven approach in combination with an adaptation of the sensor value range upon generation of an interrupt. After generation of an interrupt, a modified sensor value range is applied to the sensor, whereby the modified sensor value range covers the sensor value generating the interrupt. Accordingly, no further interrupts are generated unless the sensor value leaves the modified sensor value range. This is implemented for each sensor independently. Thereby, the central control unit is not triggered again by additional interrupts when the sensor value remains constant, i.e. outside the former sensor value range. New interrupts are only generated, when the sensor value changes and leaves the modified sensor value range. Additional interrupts, which would indicate a sensor value equal to a sensor value which already generated an interrupt, are prevented and the occupation of resources of the central control unit is reduced.

Problems can occur regarding the reliability of sensors and the detection of interrupts. Depending on the environment conditions of a sensor, the reliability can be limited or decrease with lifetime of the sensor. For example thermal conditions like high ambient temperatures have a negative impact on the reliability of sensors. In some cases interrupts may be lost, e.g. due to electric or electronic defects, so that the central control unit will not be informed about the sensor value passing the at least one threshold value. In other cases interrupts can be created although the sensor value lies within the sensor value range. Nevertheless, to achieve reliable measurement data, it is important to place sensors close to heat sinks, so that the sensors are exposed to high temperatures. Thermal conditions are crucial in IT-systems, where components of the IT-system can be damaged when exposed to high temperatures.

BRIEF SUMMARY

It is therefore an object of the invention to provide a method, a computer-readable medium containing a set of instructions that causes a computer to perform the method, a computer program product comprising a computer-usable medium including computer-usable program code, wherein the computer-usable program code is adapted to execute the method and a system for operating at least one sensor being connected to a central control unit, which allows to monitor the at least one sensor with a high reliability and which requires reduced resources in the central control unit.

This object is achieved by the independent claims. Advantageous embodiments are detailed in the dependent claims.

Accordingly, this object is achieved by a method for reliably operating at least one sensor connected to a central control unit, wherein each sensor senses a sensor value for its sensor parameter and creates an interrupt to the control unit when its sensor value is outside a sensor value range limited by an upper and a lower threshold, upon generation of an interrupt by a sensor, a modified sensor value range is calculated so that the sensor value causing the interrupt lies within the modified sensor value range, and the modified sensor value range is applied to the respective sensor, comprising the additional step of repeatedly verifying correct behavior of each sensor.

An idea of the invention is to repeatedly verify correct behavior of each sensor. The sensor can have implemented a verification method, e.g. a self-check, or transmit data to the control unit which enables the control unit to verify the behavior of the sensor. Verification can be triggered internally or externally, e.g. due to an internal timer of the sensor or due to a control signal from the central control unit. In case a sensor is identified as not operating correctly, countermeasures can be taken. Two major reasons for sensor failure comprise malfunction of a sensor itself or malfunction in a signal path between the sensor and the central control unit. Accordingly, possible countermeasures comprise calling for maintenance, calibrating the sensor, resetting the sensor, starting an error identification procedure, deactivating the sensor, activating at least one further sensor as substitute, establishing an alternative data connection, or modifying the processing of the control unit, e.g. by adding an estimation for sensor values based on other sensor in the proximity of the sensor not operating correctly. Thereby, it is assured that the central control unit is always aware of the correct state of the conditions to be measured by the connected sensors. Repeatedly verifying correct behavior of each sensor can comprise a periodic verification. Also different kinds of verification can be implemented, wherein each kind of verification can be independent from other kinds of verification, e.g. periodic verification can be used with different verification periods.

It is to be noted that a sensor according to the present invention refers to any kind of physical sensor. Each sensor senses a particular sensor parameter, e.g. temperature, humidity current or voltage. The sensor creates a current sensor value for its parameter, which can be done continuously or in predefined time intervals. The sensor comprises a logic circuit for comparing the current sensor value to the given threshold and for generating the interrupt. Nevertheless, multiple sensors can be provided having a common logic circuit for comparing each current sensor value to the corresponding thresholds and generating corresponding interrupts. Also, implementations of the logic circuit as controller are included. The use of an upper and a lower threshold enables the sensor value range, and thereby the two thresholds, to be modified in both directions, i.e. upwards and downwards. With only one threshold, the threshold could only be increased or decreased, depending on whether the threshold is an upper or a lower threshold.

An inventive system comprises at least one sensor and a central control unit for monitoring the at least one sensor for executing the method according to the above method. The method can be implemented in different ways within the system, wherein the sensors and the central control unit can perform different parts of the method. For example, the central control unit can have a redundant storage for keeping threshold values for at least some sensors, or request each threshold from each sensor when required. The central control unit can be a dedicated central control unit for monitoring the system, or can be implemented as part of a system, e.g. an IT-system. In the latter case, the central control unit has to share resources with the IT-system, e.g. processor power, storage memory and others. The control unit can comprise a program running on such an IT-system, so that no dedicated processing unit is required for the central control unit. The additional verification of the behavior of the sensor can be implemented as described above within the sensor or the central control unit. The central control unit is adapted to obtain the result of the verification or relevant information for performing the verification by itself.

According to one embodiment of the present invention, the step of verifying correct behavior of each sensor comprises polling each sensor to transmit its sensor value to the central control unit and verifying if the sensor value lies within the sensor value range. Polling the sensor is performed in addition to the interrupt handling. Polling a sensor enables a verification of a sensor behavior. The sensor value is compared by the control unit to the sensor value range independently from generated interrupts. The upper and lower threshold forming the sensor value range can be stored in the central control unit, so that these values can be easily accessed for comparing the transmitted sensor value to the sensor value range. In one embodiment, the upper and lower thresholds are stored in the sensor and transmitted from the sensor to the control unit for performing this comparison.

In a modified embodiment of the present invention, the verifying correct behavior of each sensor comprises verifying if the sensor value of a sensor generating an interrupt lies outside the sensor value range. This operation refers to the detection of invalid interrupts, which are generated when the sensor value lies within the sensor value range. Accordingly, a verification can be performed every time an interrupt is generated.

In one embodiment of the present invention, the repeatedly verifying correct behavior of each sensor comprises verifying correct behavior of each sensor with a low polling frequency. Low frequency polling refers to polling with a frequency lower than used for implementing a sensor according to a polling approach. Hence, the value of the low polling frequency depends on the sensor itself, the system requirements and others and can therefore not be specified in more detail. Although the term "low polling frequency" comprises the term "polling", which is used in the context of the polling approach for monitoring sensors, it is to be noted that the "low polling frequency" can also refer to method steps, which do not require a transmission of a sensor value to the control unit. Important is only the frequency for verifying correct behavior of each sensor.

A modified embodiment of the present invention further comprises incrementing an error counter if an incorrect behavior of the sensor is detected, and verifying correct behavior of each sensor comprises verifying if the error counter exceeds a given limit for each sensor. Depending on the implementation and the requirements, a sensor can be marked as faulty based on a first incorrect behavior being detected, or only after the detection of a certain number of incorrect behaviors. The limit can be calculated as an absolute value, or as a value in respect to a given time period. The time and the limit can be defined, e.g. by a user or based on system requirements. The error counter can be reset every time period. In case the time of the occurrence of each incorrect behavior is stored, a continuously moving time interval can be implemented. Accordingly, the central control unit can increase the error counter upon detection of an incorrect behavior and decrease the error counter when an incorrect behavior leaves the monitored time interval.

A modified embodiment of the present invention comprises switching a sensor showing incorrect behavior into a polling mode and polling each faulty sensor with a high polling frequency. A faulty sensor refers to a sensor which is no longer capable of creating interrupts to the central control unit, e.g. due to failures of the sensor itself or of a transmission path from the sensor to the central control unit. This kind of error handling is initiated by the central control unit. The faulty sensor is then operated as known from systems implementing a polling scheme, so that the sensor value is transmitted with the high polling frequency to the central control unit. The central control unit can then compare the sensor value to the sensor value range. The polling frequency in this case is high compared to the low polling frequency for verifying correct behavior, and is selected e.g. in accordance with a system using a general polling approach for monitoring sensors. The value of the high polling frequency depends on the sensor itself, system requirements and others and can therefore not be specified in more detail. The generation of interrupts by the faulty sensor is deactivated to reduce occupation of the control unit. The control unit can also perform an additional verification of the behavior of the sensor.

In a modified embodiment of the present invention, the calculating a modified sensor value range comprises shifting the sensor value range. The width of the sensor value range is not modified, so that the modification of the sensor value range can be easily performed. The sensor value range is shifted in the direction of the sensor value causing the interrupt.

In one embodiment of the present invention, the calculating a modified sensor value range comprises defining the sensor value causing the interrupt plus an upper offset as upper threshold and defining the sensor value causing the interrupt reduced by a lower offset as lower threshold. The offset can be a static value, or can be dynamically adapted, e.g. when the sensor value reaches critical values. The calculation of the modified sensor value range can be easily implemented based on the current sensor value.

In another embodiment of the present invention, the offset for the two thresholds is chosen to be different. This allows calculating an asymmetric sensor value range based on the sensor value causing the interrupt, so that e.g. sensor values further outside the initial sensor value range can more rapidly cause a further interrupt to the central control unit. Also, in case of the sensor value approaching a critical limit or a limit depending on the sensor capabilities, an asymmetric sensor value range can be helpful, either to monitor if the sensor value further approaches the critical limit or the distance to the critical limit increases.

A modified embodiment of the present invention comprises self-adapting of the width of the sensor value range. Self-adapting can be based on the kind of sensor parameter, number of interrupts per time, sensor values themselves, critical limits of sensor values, reaching an upper or a lower threshold, or others. Also a configuration of the width of the sensor value range by a user is possible.

The object of the invention is also achieved by a computer-readable medium such as a storage device, a floppy disk, CD, DVD, Blue Ray disk, or a random access memory (RAM), containing a set of instruction that causes a computer to perform the method as specified above. The object is further achieved by a computer program product comprising a computer usable medium including computer usable program code, wherein the computer usable program code is adopted to execute the method as described above.

BRIEF DESCRIPTION OF THE SEVERAL VIEWS OF THE DRAWINGS

Embodiments of the invention are illustrated in the accompanied figures. These embodiments are merely exemplary, i.e., they are not intended to limit the content and scope of the appended claims.

DETAILED DESCRIPTION

Figure 1:
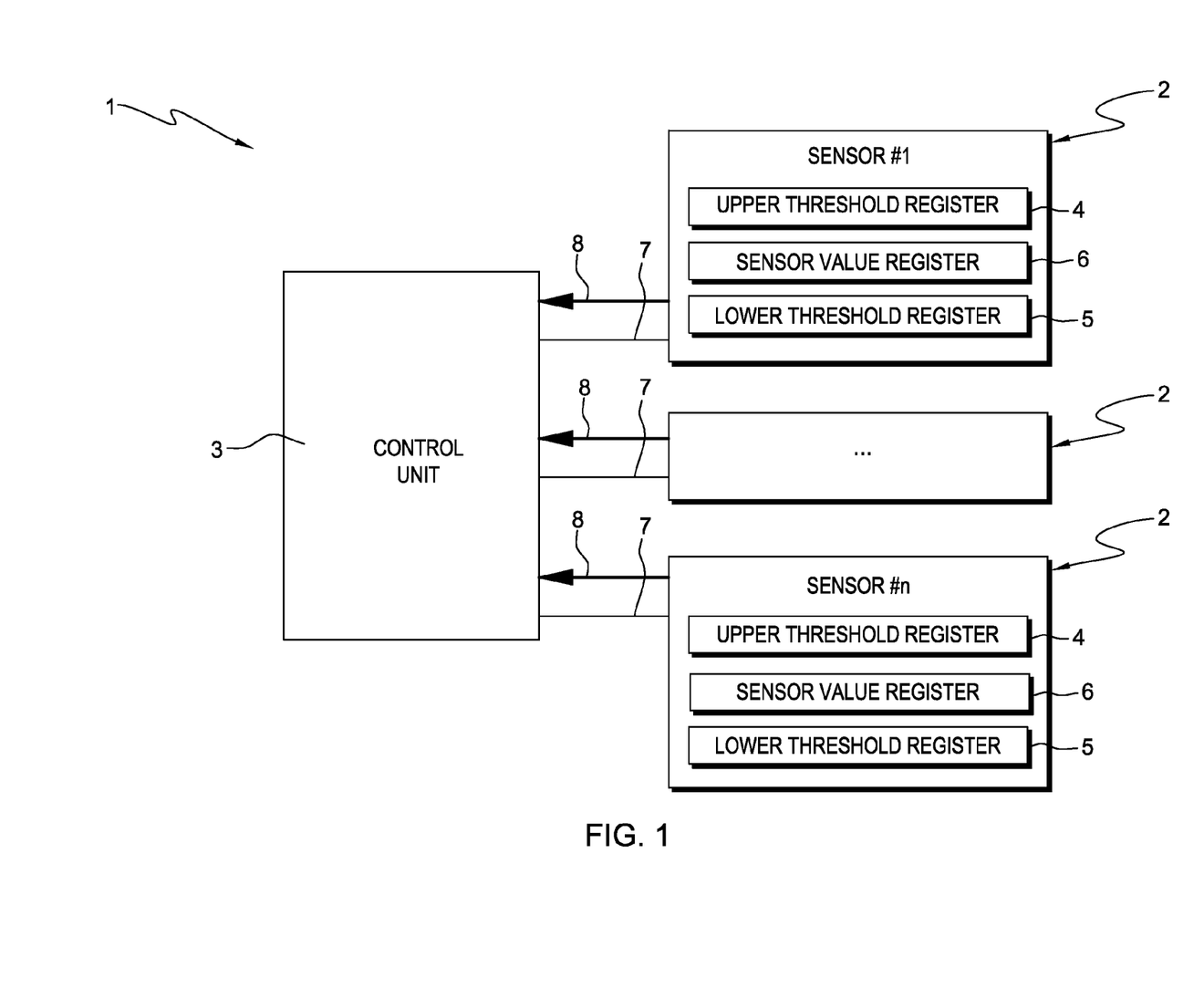
FIG. 1 shows a system for reliably operating multiple sensors connected to a central control unit as a schematical diagram.

Referring to FIG. 1, a system 1 comprising multiple sensors 2 and a central control unit 3 is shown. In this example, a number of n sensors is provided, each comprising three registers, i.e. an upper threshold register 4, a lower threshold register 5 and a sensor value register 6. The upper threshold register 4 contains an upper threshold, whereas the lower threshold register 5 contains a lower threshold, the upper and the lower threshold defining a sensor value range lying between the upper and the lower threshold. The sensor value register 6 contains a current sensor value and is updated according to an implementation of the sensor 2, e.g. continuously or in pre-defined time intervals. Each sensor 2 is connected to the central control unit 3 by means of a data line 7, which enables the central control unit 3 to read and write the upper and the lower threshold registers 4, 5, and to read the sensor value register 6. Accordingly, the data line 7 is a bidirectional data line 7. Furthermore, each sensor 2 is connected to the central control unit 3 by an interrupt line 8, which is active if a sensor 2 generates an interrupt. Active refers to any state indicating an interrupt and is not limited to any kind of signal. Although the sensors 2 can be implemented to sense different parameters, e.g. temperature, current, voltage or others, the general behavior and handling within the system 1 is identical.

The central control unit 3 monitors the sensors 2 and performs a reliable operation. The control unit 3 can execute a monitoring software, or the monitoring can be implemented in hardware. In case an interrupt is received from a sensor 2 via the interrupt line 8, the central control unit 3 interrupts its execution and the registers 4, 5, 6 of the sensor 2 are read and evaluated. Details of the reliable operation are described below.

Figure 2:
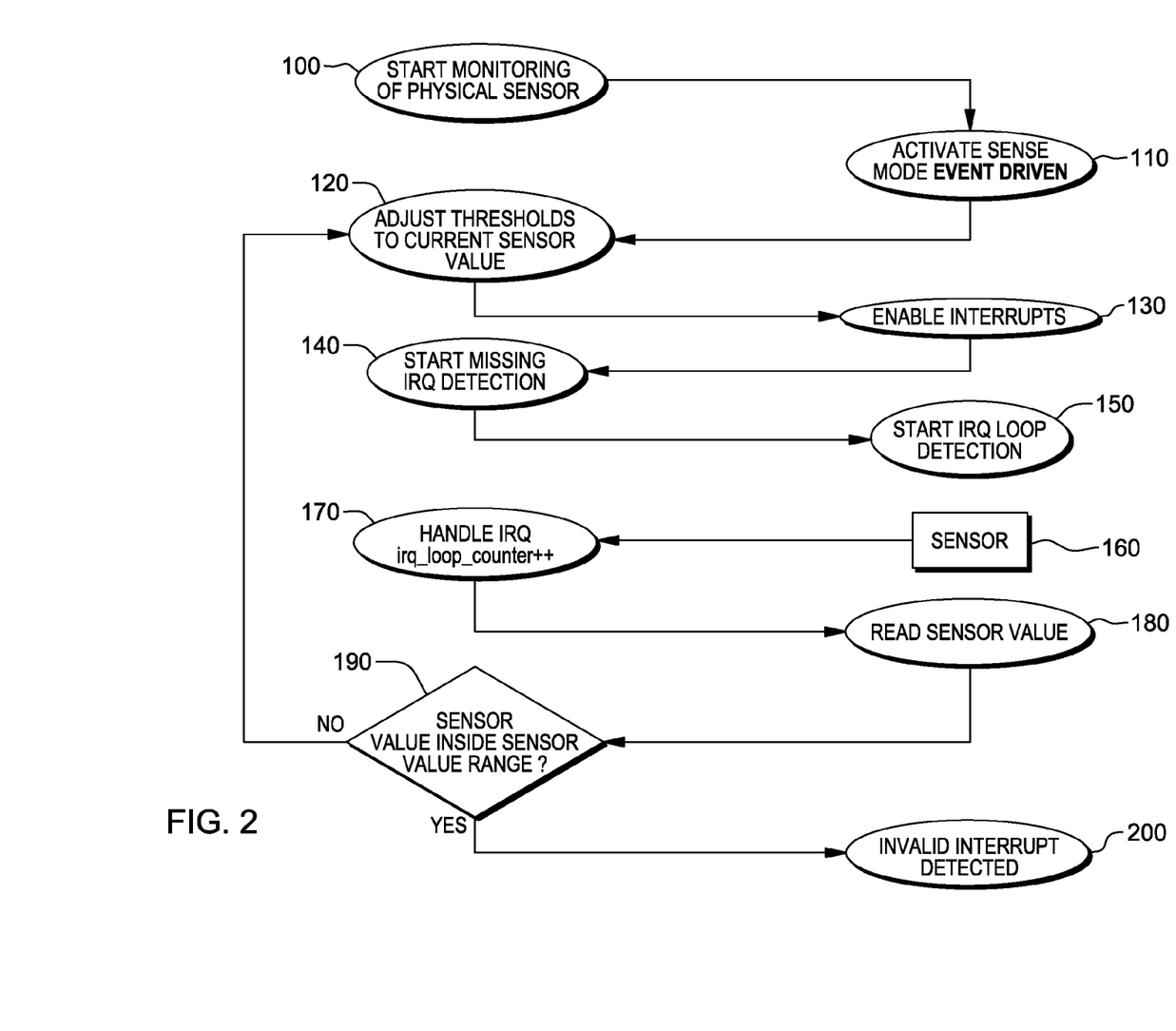
FIG. 2 shows a flowchart of one embodiment of the inventive method for reliably operating a sensor connected to a central control unit.

According to FIG. 2, in step 100 the monitoring of the sensors 2 is started by the central control unit 3. The sensors 2 sense physical parameters, e.g. temperature, current, voltage or others and can be of any kind.

In step 110, an event driven operation mode, also referred to as event driven sense mode, is activated. The detailed configuration is realized in the subsequent steps 120 to 150.

In step 120, the thresholds for each sensor 2 are adjusted based on their current sensor values. Accordingly, the central control unit 3 first reads the sensor value register 6 of a sensor 2 and calculates values for the upper and the lower threshold. In this exemplary embodiment of the present invention, the thresholds are calculated by adding an offset, also referred to as delta (Δ), to the current sensor value for calculating the upper threshold and subtracting an offset from the current sensor value for calculating the lower threshold. The upper and the lower threshold are then transmitted via the data line 7 to the respective sensor 2 and written to the upper and the lower threshold registers 4, 5, respectively.

According to step 130, interrupt handling in the central control unit 3 is enabled. Accordingly, all sensors 2 start to provide interrupts to the central control unit 3 depending on their upper and lower thresholds and their sensor values.

Additionally, in step 140, the central control unit 3 starts the detection of lost interrupts. This step is referred to in FIG. 2 as "missing IRQ detection". Details are given below with respect to FIG. 3.

In step 150, the detection of too many interrupts per time is started. This is also referred to as "IRQ loop detection" and represents one means for verifying correct behavior of a sensor. Details are given below with respect to FIG. 4.

In the event driven operation mode, the central control unit 3 is idle and waiting for interrupts from the sensors 2, which are generated in step 160.

In step 170, the interrupt is received by the central control unit 3, which increments an interrupt counter called IRQ_loop_counter.

In step 180, the central control unit 3 reads via data line 7 the current sensor value from the sensor value register 6 of the respective sensor 2 which generated the interrupt.

In step 190, the central control unit 3 verifies if the current sensor value is inside the sensor value range lying between the upper and the lower threshold for the respective sensor 2. This allows the detection of invalid interrupts, which refers to interrupts which are generated when the sensor value lies inside the sensor value range, and represents one means of verifying correct behavior of a sensor. If an invalid interrupt is detected, the method continues in step 200 with the handling of the invalid interrupt. Otherwise, the method continues with step 120, where new thresholds for the respective sensor 2 are calculated, thereby forming a modified sensor value range. The thresholds are then transmitted to the respective sensor 2 and stored in the registers 4, 5 as already described with respect to step 120.

Figure 6:
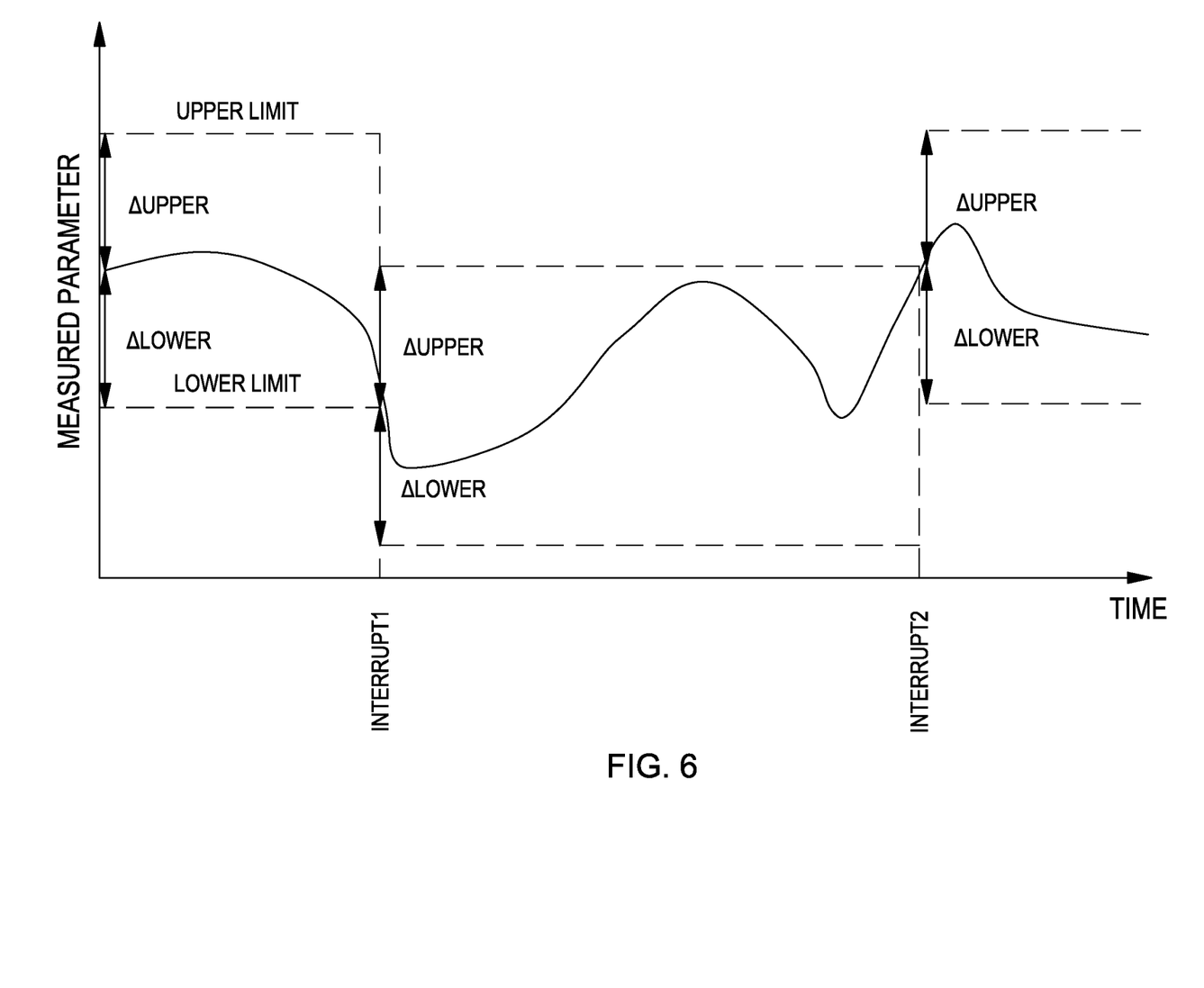
FIG. 6 shows a diagram of a sensor value over the time and a resulting modification of the sensor value range.

The normal behavior of the system is illustrated in FIG. 6. At an initial point of time, which is shown at the left end side of the diagram of FIG. 6 and corresponds to step 120, the sensor value range is defined as the current sensor value plus/minus delta ($\Delta$). Accordingly, the upper limit, i.e. the upper threshold, is set to the current sensor value plus $\Delta$upper, whereas the lower limit, i.e. the lower threshold is set to the current value minus $\Delta$lower. At the point of time marked as interrupt1, which corresponds to step 160, the sensor value falls below the lower threshold. Accordingly, the central control unit 3 processes the interrupt, including steps 170 and 180. After verification if the sensor value lies outside the sensor value range in step 190, the central control unit 3 modifies the sensor value range in step 120. In detail, in step 120 the current sensor value at the point interrupt1 is used for calculating a modified sensor value range as described earlier. At the point of time marked as interrupt2, the sensor value exceeds the upper threshold. Accordingly, at the point of time marked as interrupt2, a further modified sensor value range is defined, which in this embodiment of the present invention is identical to the initial sensor value range. Nevertheless, the sensor value range is calculated as already described before with respect to step 120.

Figure 3:
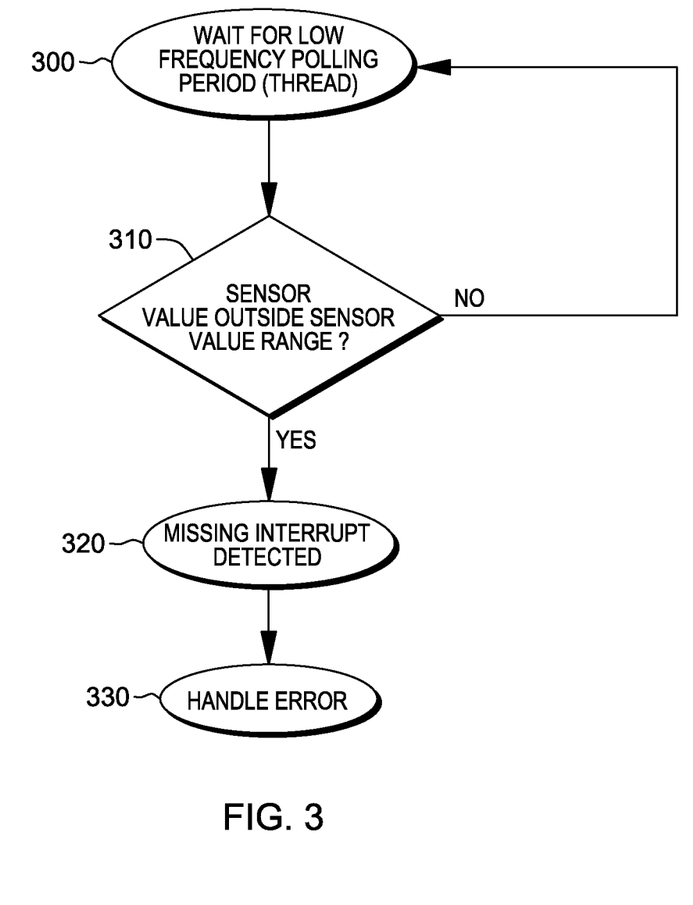
FIG. 3 shows a flowchart of a thread for detecting missing interrupts.

FIG. 3 shows an implementation of a thread for detecting missing interrupts, which represents a further means for verifying correct behavior of the sensor. The thread starts with step 300 and waits for a low frequency polling period $T_{poll,low}$. At expiry of this low frequency polling period $T_{poll,low}$, the central control unit 3 reads the sensor value register 6 from a sensor 2 via data line 7 and verifies, if the sensor value is outside the sensor value range. In this embodiment, the upper and the lower threshold are not stored in the central control unit 3 and accordingly have to be read from the upper threshold register 4 and the lower threshold register 5 of the respective sensor 2 via data line 7. Alternative embodiments can comprise additional registers in the control unit 3 for holding the thresholds for some or all of the connected sensors 2.

Figure 7:
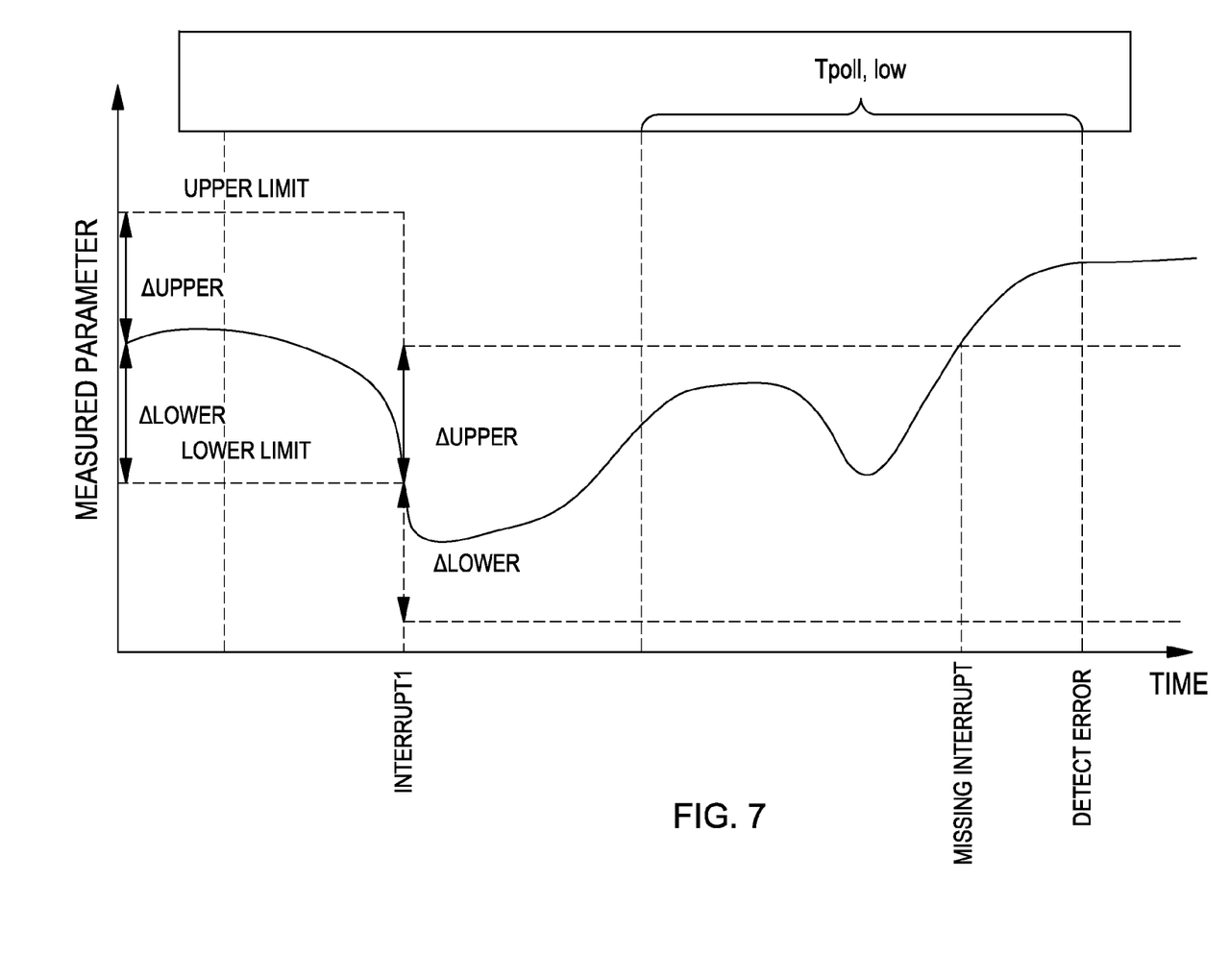
FIG. 7 shows a diagram of a sensor value over the time with the detection of a missing interrupt.

If the sensor value is inside the sensor value range, the method returns to step 300 to continuously monitor the sensor 2. If the sensor value lies outside the sensor value range, according to step 320 a missing interrupt is detected. Since an interrupt leads to a modification of the sensor value range, the sensor value lying outside the sensor value range is a clear indication that no interrupt was generated when the sensor value left the sensor value range. This can be seen with respect to FIG. 7. At the point of time marked as "missing interrupt", the sensor value exceeds the upper threshold, but no interrupt is generated. Accordingly, the sensor value range is not modified at the point of time marked as "missing interrupt". At the point of time marked as "detect error", low frequent polling occurs with $T_{poll,low}$ to verify the behavior of the respective sensor 2 by the central control unit 3. Accordingly, the central control unit 3 reads the sensor value register 6 and the upper and lower threshold registers 4, 5 and verifies, if the sensor value lies in the range defined by the upper and the lower threshold. At the point of time marked as "detect error", the sensor value lies above the upper threshold and accordingly a missing interrupt is detected. The respective counter for counting the missing interrupts is increased, as already described.

According to step 330, error handling is performed. Details are given below with respect to FIG. 5.

Figure 4:
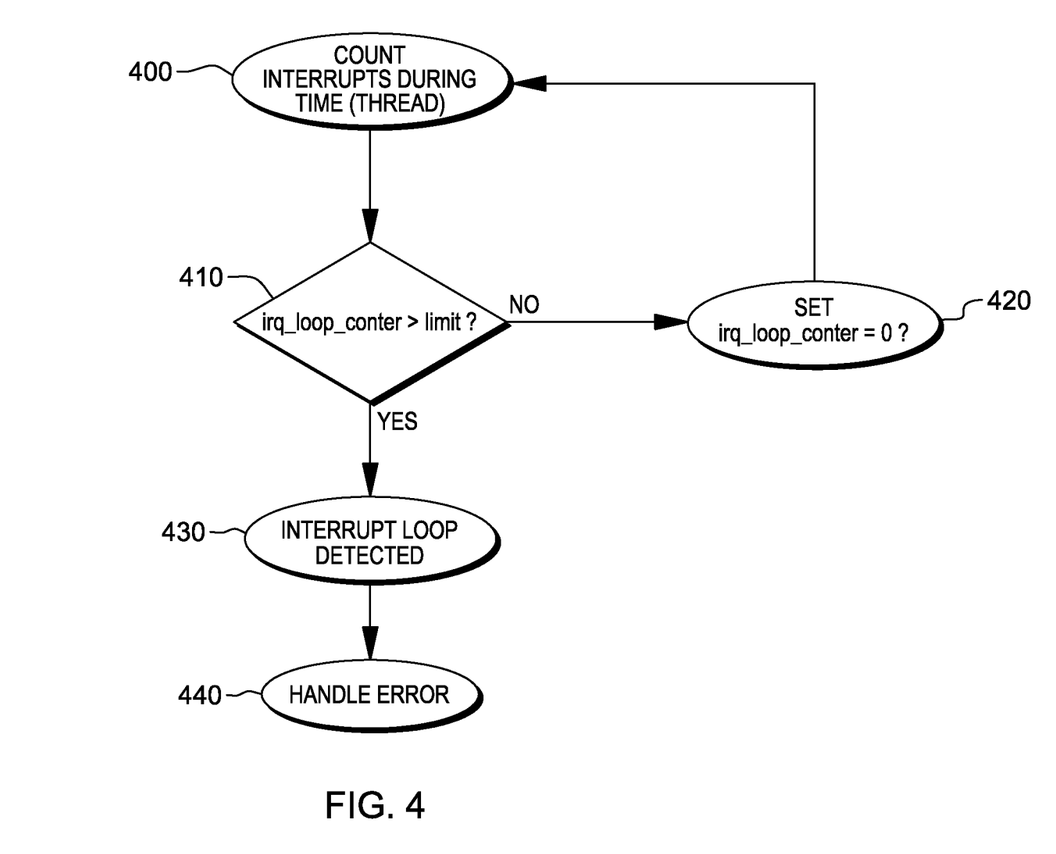
FIG. 4 shows a flowchart of a thread for interrupt loop direction.

Referring now to FIG. 4, a thread for IRQ loop detection is shown. The thread starts with step 400, where generated interrupts are counted during a specified time. At expiry of the specified time, the method continues with step 410. In step 410 is verified, if the IRQ_loop_counter is above given limit. If not, the method continuous with step 420. Otherwise, it continues with step 430.

According to step 430, an interrupt loop is detected when the number of interrupts per time unit exceeds a given limit.

In step 440, error handling is started. Details are given with respect to FIG. 5.

Figure 5:
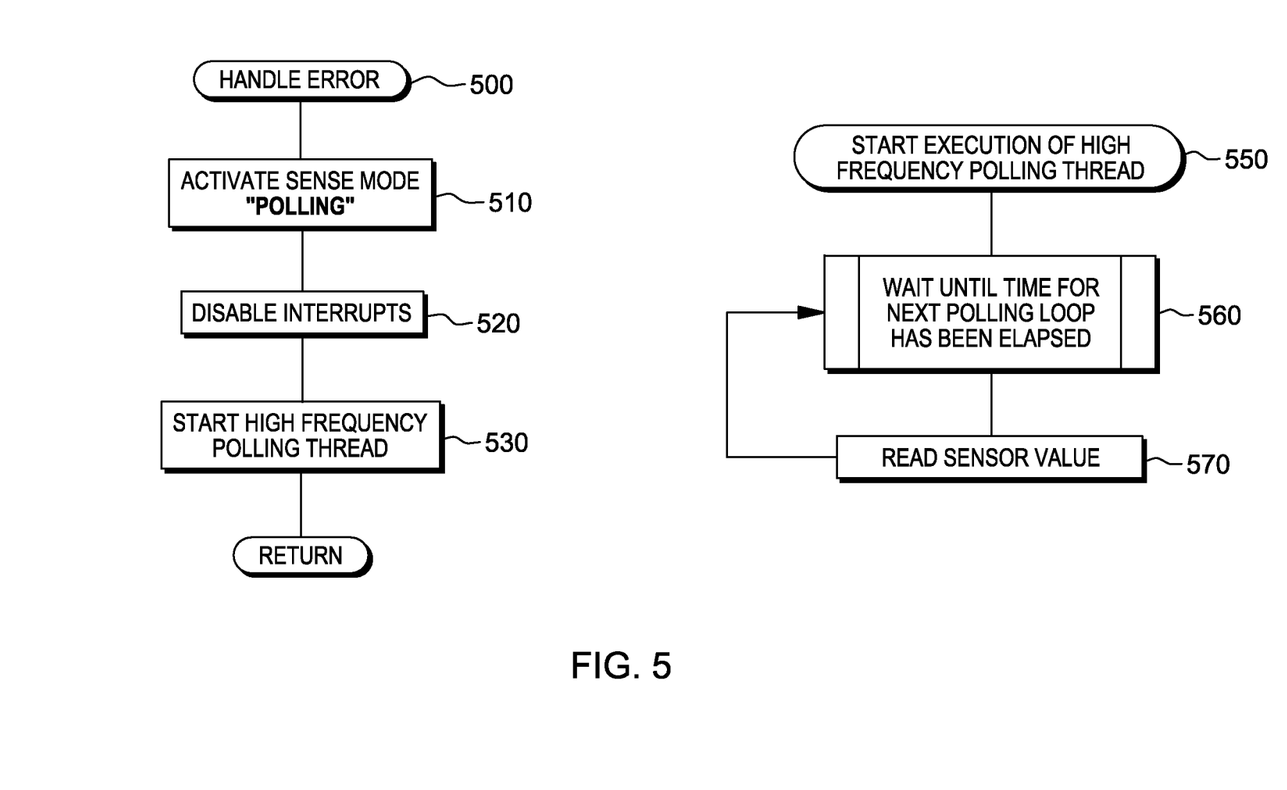
FIG. 5 shows a flowchart for two threads showing an error handling of faulty sensors.

Now referring to FIG. 5, error handling after detection of a faulty sensor 2 is shown. The error handling is started in step 500.

According to step 510, the sense mode or operation mode is set to "polling". The central control unit 3 starts the processing required for switching the operation mode, which is shown in more detail in respect to steps 520 and 530.

In step 520, interrupt handling is disabled. This refers to the to the central control unit 3 and, depending on the implementation, can also refer to the respective sensor 2 to disable interrupts from the sensor 2.

In step 530, a thread for polling is started at the central control unit 3. Details for this thread are described with respect to steps 550 to 570.

In step 540, the thread finishes and the central control unit 3 returns to the processing according to its operation mode.

The thread starting at step 550 executes the high frequency polling as already introduced above. High frequency polling is applied with high frequency poll period $T_{poll,high}$ to continuously monitor the respective sensor 2. The poll period is chosen depending on the sensor 2 where polling is applied. The method then continues with step 560.

In step 560 the thread waits for the time specified by the high frequency poll period $T_{poll,high}$. At expiry of the high frequency poll period $T_{poll,high}$, the thread continues with step 570.

According to step 570, the sensor value is read from the sensor value register 6. The sensor value is processed according to the implementation in the central control unit 3, including error handling as implemented in case of interrupts. The method then returns to step 560 for repeated high frequency polling.

Figure 9:
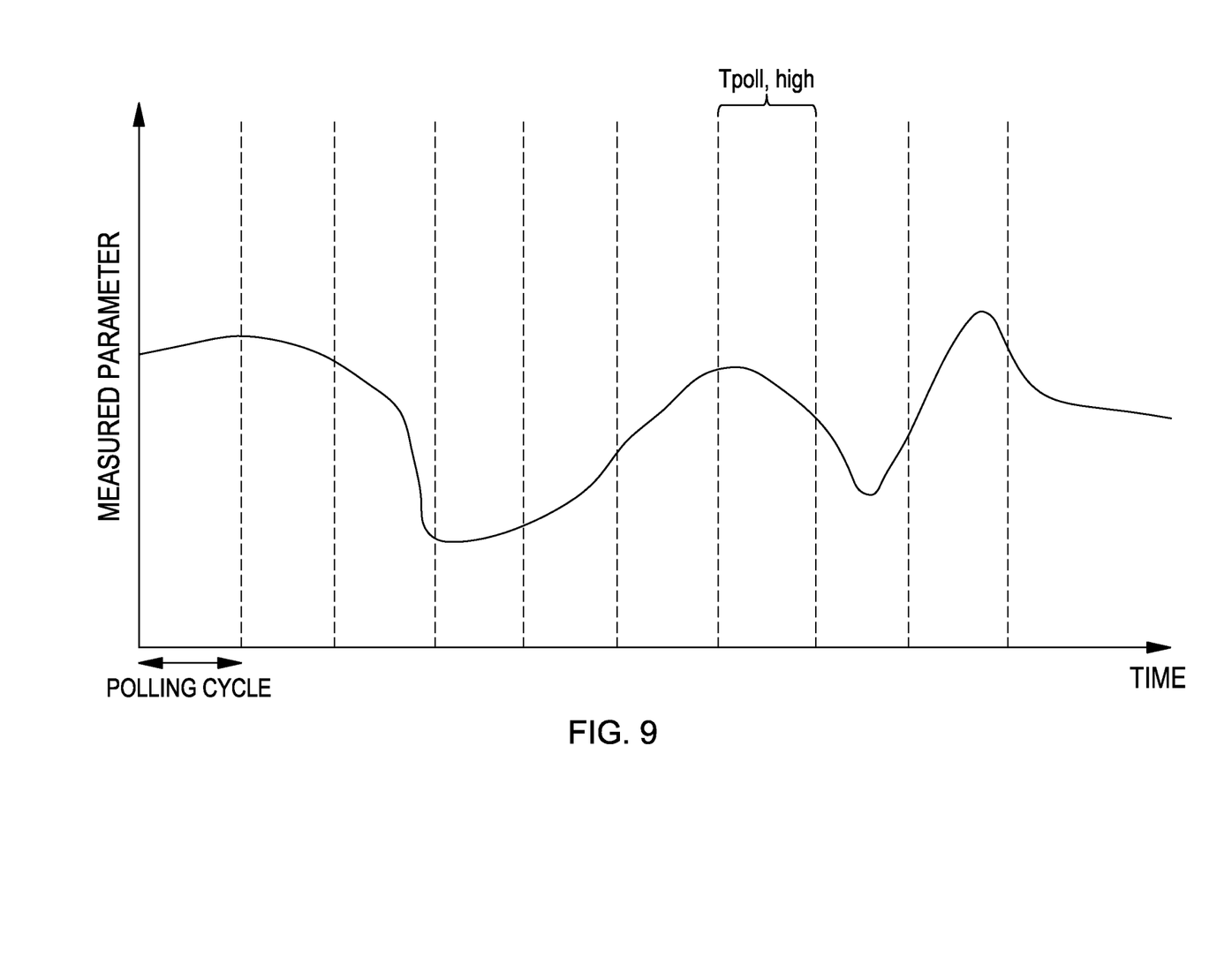
FIG. 9 shows a diagram of a measured parameter value over time with applied high frequency polling.

The repeated high frequency polling is also shown with respect to FIG. 9. According to FIG. 9, the central control unit 3 polls the sensor 2 every polling cycle, i.e. once every high frequency poll period.

Figure 8:
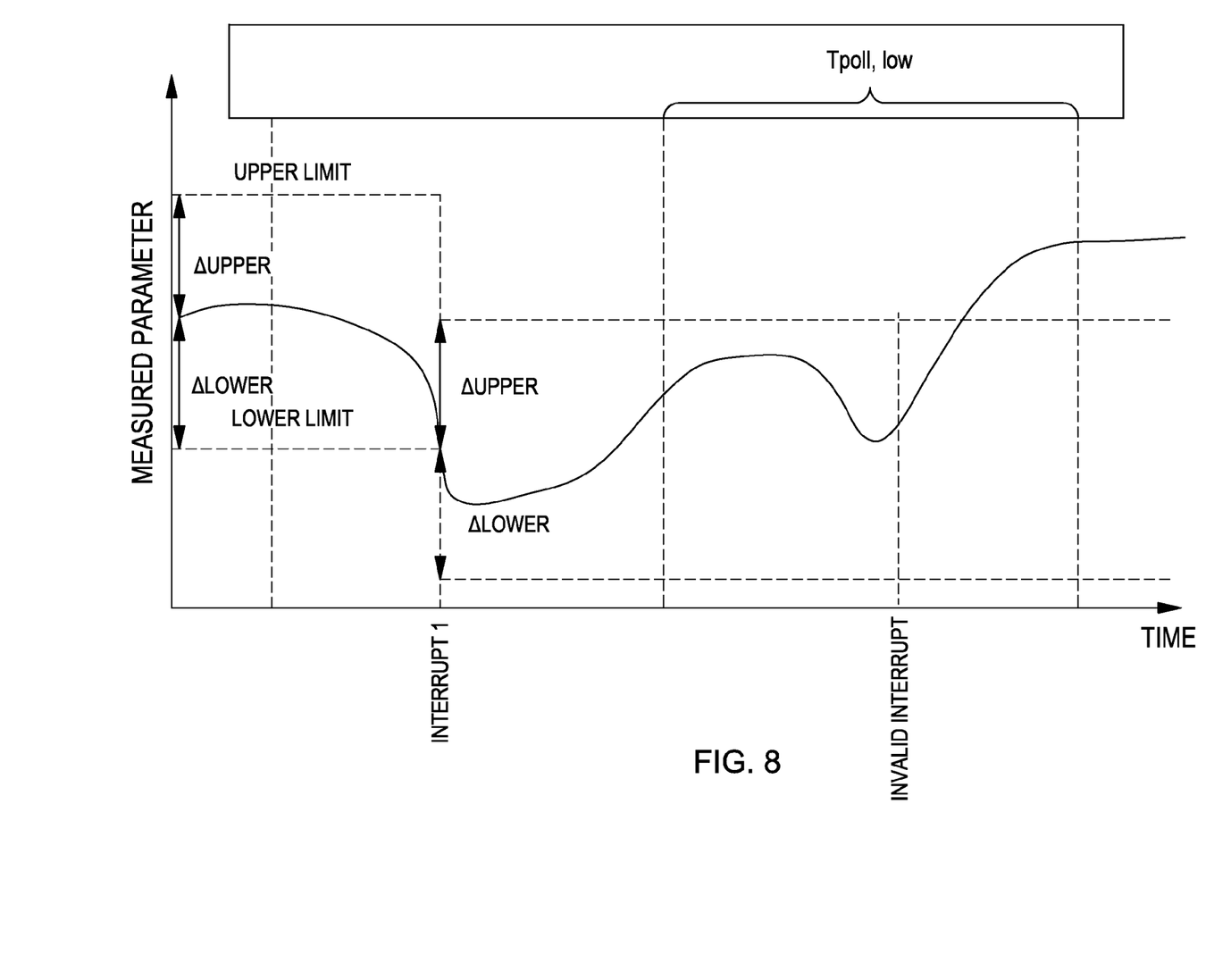
FIG. 8 shows a diagram of a measured parameter value over time for the detection of an invalid interrupt.

Identification of invalid interrupts is shown with respect to FIG. 8. An invalid interrupt occurs at the point of time marked as "invalid interrupt" on the time axis and is independent from polling. Such an invalid interrupt can for example occur due to problems in the sensor 2, e.g. when its electronic circuit does not work properly due to a faulty electronic component. The respective sensor 2 generates an interrupt to the central control unit 3 via the interrupt line 8. The central control unit 3 reads the sensor value register 6 and the upper and lower threshold registers 4, 5 of the respective sensor 2 and verifies, if the sensor value lies within the sensor value range. Since the sensor value lies within this sensor value range, an invalid interrupt is identified and the respective counter for invalid interrupts is increased.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been illustrated and described in detail in the drawings and fore-going description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A method for reliably operating at least one sensor connected to a central control unit, comprising:
   each sensor sensing a sensor value for its sensor parameter and creating an interrupt to the central control unit when its sensor value is outside a sensor value range limited by an upper and a lower threshold;
   upon generation of an interrupt by one sensor of the at least one sensor, the control unit handles the interrupt by:
      polling the one sensor for its current sensor value;
      determining whether the current sensor value is within the sensor value range;
      detecting an invalid interrupt based on the current sensor value being within the sensor value range; and
      determining a modified sensor range when both the sensor value and the current sensor value are outside the sensor value range, the determining using one of the sensor value or the current sensor value, wherein a width of the sensor value range and a width of the modified sensor range are equivalent; and
   applying, when determined, the modified sensor value range to the one sensor; and
   wherein the method further comprises repeatedly verifying correct behavior of each sensor of the at least one sensor.

2. The method according to claim 1, wherein the verifying correct behavior of each sensor comprises polling each sensor to transmit its sensor value to the central control unit and verifying if the sensor value lies within the sensor value range.

3. The method according to claim 1, wherein the verifying correct behavior of each sensor comprises verifying if the sensor value of a sensor generating an interrupt lies outside the sensor value range.

4. The method according to claim 1, wherein the repeatedly verifying correct behavior of each sensor comprises verifying correct behavior of each sensor by checking to determine whether the sensor failed to create the interrupt upon the sensor value being outside the sensor value range.

5. The method according to claim 1, further comprising:
   incrementing an error counter if an incorrect behavior of the sensor is detected; and
   the verifying correct behavior of each sensor comprises verifying if the error counter exceeds a given limit for each sensor.

6. The method according to claim 1, further comprising switching a sensor showing incorrect behavior into a polling mode and polling each sensor showing the incorrect behavior, wherein the incorrect behavior is a count of interrupts generated by the sensor within a specified time being above a set threshold.

7. The method according to claim 1, wherein the calculating a modified sensor value range comprises shifting the sensor value range.

8. The method according to claim 1, wherein the calculating a modified sensor value range comprises defining the sensor value causing the interrupt plus an upper offset as upper threshold and defining the sensor value causing the interrupt reduced by a lower offset as lower threshold.

9. The method according to claim 8, wherein the upper offset and the lower offset are chosen to be different.

10. The method according to claim 1, wherein the width of the sensor value range is self-adapting.

11. A computer program product for reliably operating at least one sensor connected to a central control unit, the computer program product comprising:
    a non-transitory computer-readable storage medium readable by a processor and storing instructions for execution by the processor for facilitating performing a method comprising:
       each sensor sensing a sensor value for its sensor parameter and creating an interrupt to the central control unit when its sensor value is outside a sensor value range limited by an upper and a lower threshold;
       upon generation of an interrupt by one sensor of the at least one sensor, the control unit handles the interrupt by:
          polling the one sensor for its current sensor value;
          determining whether the current sensor value is within the sensor value range;
          detecting an invalid interrupt based on the current sensor value being within the sensor value range; and
          determining a modified sensor range when both the sensor value and the current sensor value are outside the sensor value range, the determining using one of the sensor value or the current sensor value, wherein a width of the sensor value range and a width of the modified sensor range are equivalent; and
       applying, when determined, the modified sensor value range to the one sensor; and
       wherein the method further comprises repeatedly verifying correct behavior of each sensor of the at least one sensor.

12. The computer program product of claim 11, wherein the verifying correct behavior of each sensor comprises polling each sensor to transmit its sensor value to the central control unit and verifying if the sensor value lies within the sensor value range.

13. The computer program product of claim 11, wherein the verifying correct behavior of each sensor comprises verifying if the sensor value of a sensor generating an interrupt lies outside the sensor value range.

14. The computer program product of claim 11, wherein the repeatedly verifying correct behavior of each sensor comprises verifying correct behavior of each sensor by checking to determine whether the sensor failed to create the interrupt upon the sensor value being outside the sensor value range.

15. The computer program product of claim 11, further comprising:
    incrementing an error counter if an incorrect behavior of the sensor is detected; and the verifying correct behavior of each sensor comprises verifying if the error counter exceeds a given limit for each sensor.

16. The computer program product of claim 11, further comprising switching a sensor showing incorrect behavior into a polling mode and polling each sensor showing the incorrect behavior, wherein the incorrect behavior is a count of interrupts generated by the sensor within a specified time being above a set threshold.

17. The computer program product of claim 11, wherein the calculating a modified sensor value range comprises shifting the sensor value range.

18. The computer program product of claim 11, wherein the calculating a modified sensor value range comprises defining the sensor value causing the interrupt plus an upper offset as upper threshold and defining the sensor value causing the interrupt reduced by a lower offset as lower threshold.

19. A computer system for reliably operating at least one sensor connected to a central control unit, the computer system comprising:
    a memory; and
    a processor in communications with the memory, wherein the computer system facilitates performing a method, the method comprising:
        each sensor sensing a sensor value for its sensor parameter and creating an interrupt to the central control unit when its sensor value is outside a sensor value range limited by an upper and a lower threshold;
        upon generation of an interrupt by one sensor of the at least one sensor, the control unit handles the interrupt by:
            polling the one sensor for its current sensor value;
            determining whether the current sensor value is within the sensor value range;
            detecting an invalid interrupt based on the current sensor value being within the sensor value range; and
            determining a modified sensor range when both the sensor value and the current sensor value are outside the sensor value range, the determining using one of the sensor value or the current sensor value, wherein a width of the sensor value range and a width of the modified sensor range are equivalent; and
            applying, when determined, the modified sensor value range to the one sensor; and
        wherein the method further comprises repeatedly verifying correct behavior of each sensor of the at least one sensor.

20. The computer system of claim 19, wherein the verifying correct behavior of each sensor comprises polling each sensor to transmit its sensor value to the central control unit and verifying if the sensor value lies within the sensor value range.

* * * * *